Patented Mar. 21, 1944

2,344,793

UNITED STATES PATENT OFFICE 2,344,793

COATING COMPOSITION

Oscar W. Tissari, Philadelphia, Pa., assignor to E. I. du Pont de Nemours & Company, Wilmington, Del., a corporation of Delaware No Drawing. Application April 25, 1942, Serial No. 440,472

7 Claims. (Cl. 260—21)

This invention relates to coating compositions and more particularly to synthetic resin baking enamels which are resistant to yellowing in diffused light and to marring both initially and in service.

With the development of new and improved synthetic resinous materials, their use in coating compositions has been greatly extended. Marked progress has been made in the development of both air drying and baking synthetic resin enamels. While such enamels have yielded in general satisfactory service, there are certain properties in which improvement is desirable. Extensive commercial use has been made of white synthetic resin enamels for finishing such articles as refrigerators, kitchen cabinets and other kitchen furniture, hospital equipment, etc. These finishes yield long and satisfactory service but have in time a tendency to develop a yellowish cast which often is not uniform over the entire article. This yellowing is often objectionable from an appearance standpoint particularly since the finish is in no other way impaired and retains a considerable further service life. It is, therefore, highly desirable that the original whiteness of such finishes be maintained over a longer period of time, such as would at least approach being commensurate with the general service life of the finish. Another property of such synthetic resin baking enamels upon which improvement is desirable is that of resistance to mechanical marring, such as would be produced by scratching from fine dust or dirt particles, finger printing, etc. It is apparent that the development of any means whereby either or both of these properties in synthetic resin baking enamels may be improved is highly desirable and of considerable commercial importance.

This invention has as the principal object the provision of synthetic resin enamels, the dry films of which retain their original whiteness for a prolonged period of time and possess improved mar resistance.

A further object is the provision of such enamels having improved retention of original whiteness and improved mar resistance without impairment of other desirable and necessary properties of such enamels as application properties, baking schedules, hardness and flexibility of film, gloss, general durability, etc.

A still further object is the provision of such synthetic resin baking enamels from which films of such a nature as to not interfere with intercoat adhesion may be formed.

Another object is the provision of such enamels by means which are simple and economical.

Still another object is the provision of articles carrying a finish coating with improved retention of original whiteness and improved mar resistance.

Other objects will be apparent as the description of the invention proceeds.

These objects are accomplished in the present invention by incorporation, into synthetic resin baking enamels in minor proportion, of an organic or inorganic type waxy material having a softening point of substantially at least 60° C. Examples of such waxy materials are candelilla wax, carnauba wax, beeswax, so-called high melting point paraffin wax and purified ozokerite.

The invention will be more fully understood from the following examples which are given by way of illustration and not by way of limitation except insofar as defined in the appended claims. The parts are by weight.

EXAMPLE I

White baking enamel

A mill base having the following composition is prepared by dispersing the pigment in the vehicle by means of a ball mill or other suitable and convenient means of dispersing pigments.

| Mill base: | Parts |
|---|---|
| Titanium dioxide pigment | 31.20 |
| Urea - formaldehyde - butyl alcohol resin (60% solids) | 5.85 |
| 55% castor oil modified glyceryl phthalate (60% solids) | 7.80 |
| Hydrocarbon solvent | 11.75 |
| | 56.6 |

| Enamel composition: | |
|---|---|
| Mill base | 56.6 |
| Urea - formaldehyde - butyl alcohol resin (60% solids) | 18.5 |
| 55% castor oil modified glyceryl phthalate (60% solids) | 22.5 |
| Candelilla wax dispersion (15% solids) | 0.2 |
| Butyl alcohol | 1.7 |
| Hydrocarbon solvent | .5 |
| | 100.0 |

The enamel is prepared by mixing the ingredients under suitable agitation or by any other conventional procedure known to those skilled in the art of manufacturing synthetic resin enamels.

The candelilla wax was added as a 15% dispersion in normal butyl alcohol prepared by grinding the wax in the alcohol.

This enamel when sprayed onto a suitably primed metal surface and baked at 260° F. for one hour yields a finish of excellent initial color and color retention and which is hard, mar resistant and posses good flexibility. The coating further possesses good gloss and excellent durability for interior exposure. A finish prepared from the same enamel but containing no wax was in comparison markedly deficient in mar resistance and retention of whiteness on interior exposure.

The amount of wax used in this enamel was approximately 0.03% based on the total composition or 0.09% based on the pigment content.

EXAMPLE II

*Single coat white baking enamel*

| Mill base: | Parts |
|---|---|
| Titanium dioxide pigment | 28.90 |
| 43% soya bean oil modified glyceryl phthalate (55% solids) | 10.18 |
| Hydrocarbon solvent | 5.92 |
| | 45.00 |

| Enamel composition: | |
|---|---|
| Mill base | 45.00 |
| Urea - formaldehyde - butyl alcohol resin (60% solids) | 17.00 |
| 43% soya bean oil modified glyceryl phthalate (55% solids) | 37.00 |
| Candelilla wax dispersion (15% solids) | .20 |
| n-Butyl alcohol | .80 |
| | 100.00 |

The mill base and finished enamel may be conveniently prepared as described under Example I or by any other procedure familiar to those skilled in the art of enamel manufacture.

When sprayed onto a suitably cleaned bare steel panel and baked at approximately 260° F. for about 1 hour the enamel yields a white finish of excellent gloss and initial color. On interior exposure the finish shows markedly improved color retention over a similar finish prepared from an enamel of the same composition but containing no candelilla wax. The finish is also satisfactorily hard, possesses excellent mar resistance and has good flexibility.

In addition to applying the enamel on bare steel, it may be applied to a phosphate coated steel or a suitably organic primer coated surface and baked to yield equally satisfactory results as described above.

EXAMPLE III

*Fast baking industrial enamel*

| Mill base: | Parts |
|---|---|
| Titanium dioxide pigment | 29.10 |
| 43% soya bean oil modified glyceryl phthalate (55% solids) | 10.18 |
| Hydrocarbon solvent | 6.02 |
| | 45.30 |

| Enamel composition: | |
|---|---|
| Mill base | 45.30 |
| 43% dehydrated castor oil modified glyceryl phthalate (60% solide) | 17.90 |
| Urea - formaldehyde - butyl alcohol resin (60% solids) | 23.40 |
| Melamine-formaldehyde-n-butyl alcohol resin (50% solids) | 8.06 |
| Candelilla wax dispersion (15% solide) | 1.33 |
| Butyl alcohol | 2.90 |
| Hydrocarbon solvent | 1.11 |
| | 100.00 |

The mill base and enamel may be prepared as previously described or by any other suitable and convenient procedure.

When sprayed, or applied by other conventional method to a suitably primed steel surface and baked for from 5 to 15 minutes at approximately 325° F. this enamel yields a finish of excellent initial color and color retention and extremely hard and mar resistant.

The present invention is not intended to be limited to any particular proportions of the resins in film-forming vehicle. For certain uses the well-known semi-drying or drying oil modified polyhydric alcohol-polycarboxylic acid resins as the sole film-forming constituent are satisfactory. Where harder and tougher coatings are desired, varying combinations of the oil modified alkyd resins and urea-formaldehyde-monohydric alcohol resin or aminotriazine or substituted aminotriazine-formaldehyde monohydric alcohol resins may be used. In such combinations non-drying oil modified alkyd resins may be used as well as the semi-drying and drying oil types. The particular choice of resin or combination of resins will be governed and determined to a great extent by the particular use for the finished enamel as well as the particular properties desired in the coatings produced from the enamels. Such choice will be apparent to those skilled in the manufacture of synthetic resin enamels.

The quantity of wax to be used in the enamels based on the pigment content has been found to range between 0.05% and 1.00% with a preferred amount of approximately 0.25%. Quantities of less than 0.05% are not satisfactorily effective. Quantities greater than 1.00% do not increase the effectiveness of the wax and are likely under certain conditions to introduce objectionable "blooming" of the wax on the surface of the coating. Furthermore these greater quantities of wax may interfere with the intercoat adhesion where patching, etc., may be necessary and thus affect the usual desirable properties of a successful commercial baking enamel. This adverse effect on intercoat adhesion may manifest itself in freshly finished articles where so-called patching, due to damage in manufacture, in transportation, may be necessary or in patching or the refinishing of the article after it has been in service for a period of time.

While the examples show the introduction of candelilla wax into the enamel as a 15% dispersion (in butyl alcohol) it is not intended to be limited thereto since this is merely a convenient means. The wax may be added, if desired, for example as a solid in the form of a very fine powder or small particles of relatively uniform size. Dispersions in other liquids may be used. Further the solid material may be added in the preparation of the mill base. Variations in introducing the wax will be apparent to those skilled in the art. Other hard waxes melting above about 60° C. may be used in the examples in place of condelilla, such as those previously mentioned.

The compositions of the present invention relate principally to pigmented white or very light colored enamels. Various other white pigments than those given in the examples and conventionally used in baking enamels may be used in the present compositions.

The compositions described herein are useful for producing baked synthetic resin enamel finishes on various surfaces such as metal, wood, plastics, etc. Examples of commercial products on which the compositions or enamels are desirably used are refrigerator cabinets, under sink cabinets of metal or wood, washing machines, ironers, wall tile board, etc.

It will be apparent from the foregoing that improved synthetic resin enamels have been provided whose principal advantage over similar enamels of the present state of the art is improved retention of original whiteness in white enamels and markedly improved mar resistance. Another advantage is greater apparent surface hardness of the coating without sacrifice of flexibility. Still another advantage is no sacrifice in the desirable and necessary properties of such enamels as initial color, gloss, chip and impact resistance, print resistance, etc., with the resulting increased retention of original whiteness and markedly improved mar resistance. Another advantage is that the improved properties of retention of original whiteness and mar resistance do not affect intercoat adhesion where patching, etc., may be necessary. Other advantages will be readily apparent to those skilled in the manufacture and use of such synthetic resin enamels.

It is apparent that many widely different embodiments of this invention may be made without departing from the spirit and scope thereof, and therefore, it is not intended to be limited except as indicated in the appended claims.

I claim:

1. A light-colored coating composition comprising an alkyd resin modified with an oil having drying properties, a pigment and from .05 to 1.00% of a wax based on the pigment present, the softening point of the said wax being above 60° C.

2. The composition of claim 1 in which the wax is candelilla wax.

3. The composition of claim 1 in which a urea-formaldehyde-butyl alcohol resin is present in addition to the alkyd resin.

4. A light-colored coating composition comprising a white pigment, a urea-formaldehyde-monohydric alcohol resin, an alkyd resin modified with an oil having drying properties, a solvent, and from .05 to 1.00% of a hard wax based on the pigment present, the softening point of the said wax being above 60° C.

5. A metal surface having at least one coat thereon of a substantially white composition containing a white pigment, an oil modified alkyd resin, a urea-formaldehyde-butyl alcohol resin, and from .05 to 1.00% of a wax having a softening point above 60° C. based on the pigment.

6. The article of claim 5 in which the alkyd resin is modified with a semi-drying oil.

7. The article of claim 5 in which the wax is candelilla wax.

OSCAR W. TISSARI.